(12) United States Patent
Tazaki et al.

(10) Patent No.: US 7,109,514 B2
(45) Date of Patent: Sep. 19, 2006

(54) RADIATION IMAGE READ-OUT METHOD AND APPARATUS, AND STIMULABLE PHOSPHOR SHEET

(75) Inventors: Seiji Tazaki, Kaisei-machi (JP); Hideki Suzuki, Kaisei-machi (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 10/114,124

(22) Filed: Apr. 3, 2002

(65) Prior Publication Data

US 2002/0179869 A1     Dec. 5, 2002

(30) Foreign Application Priority Data

Apr. 4, 2001   (JP) ............................. 2001-106362
Dec. 13, 2001  (JP) ............................. 2001-379904

(51) Int. Cl.
*G21K 4/00*   (2006.01)
(52) U.S. Cl. ................. 250/581; 258/580; 258/584
(58) Field of Classification Search ............... 250/581, 250/584, 580, 484.4, 484.2, 483.1, 472.1
See application file for complete search history.

(56) References Cited

U.S. PATENT DOCUMENTS

| 4,258,264 A | 3/1981 | Kotera et al. |
| 4,346,295 A | 8/1982 | Tanaka et al. |
| 4,485,302 A | 11/1984 | Tanaka et al. |
| 4,767,927 A * | 8/1988 | Ohyama et al. ............ 250/585 |
| 4,849,630 A * | 7/1989 | Fukai et al. ................ 250/588 |
| 5,023,461 A * | 6/1991 | Nakazawa et al. ....... 250/484.4 |
| 6,515,270 B1 | 2/2003 | Isoda |
| 2002/0066868 A1* | 6/2002 | Shoji et al. .............. 250/484.4 |

FOREIGN PATENT DOCUMENTS

| JP | 55-12429 | 1/1980 |
| JP | 56-11395 | 2/1981 |
| JP | 56-11397 | 2/1981 |
| JP | 01-316699 A | 12/1989 |
| JP | 11-249243 A | 9/1999 |
| JP | 2000-330228 A | 11/2000 |

* cited by examiner

*Primary Examiner*—Otilia Gabor
*Assistant Examiner*—Christine Sung
(74) *Attorney, Agent, or Firm*—Sughrue Mion, PLLC

(57) ABSTRACT

A stimulable phosphor sheet includes a stimulable phosphor layer in contact with a protective layer which is rigid and transparent. Stimulating light is projected onto the stimulable phosphor sheet from the protective layer side, stimulated emission emitted from the stimulable phosphor layer upon exposure to the stimulating light is detected by imaging the stimulated emission on a line sensor by an imaging lens from the protective layer side while moving the stimulable phosphor sheet relatively to the line sensor in a direction intersecting the direction in which the line sensor extends.

16 Claims, 19 Drawing Sheets

RADIATION IMAGE READ-OUT METHOD AND APPARATUS, AND STIMULABLE PHOSPHOR SHEET

BACKGROUND OF THE INVENTION

1. Field of the Invention

This invention relates to a radiation image read-out method, a radiation image read-out apparatus and a stimulable phosphor sheet, and more particularly to a radiation image read-out method and a radiation image read-out apparatus for reading out a radiation image stored on a stimulable phosphor sheet by the use of a line sensor, and a stimulable phosphor sheet suitable for the method and the apparatus.

2. Description of the Related Art

When certain kinds of phosphor are exposed to a radiation such as X-rays, they store a part of energy of the radiation. Then when the phosphor which has been exposed to the radiation is exposed to stimulating rays such as visible light, light is emitted from the phosphor in proportion to the stored energy of the radiation. A phosphor exhibiting such properties is generally referred to as "a stimulable phosphor". In this specification, the light emitted from the stimulable phosphor upon stimulation thereof will be referred to as "stimulated emission". There has been known a radiation image recording and reproducing system in which a stimulating light beam such as a laser beam is projected onto a stimulable phosphor sheet (a sheet provided with a layer of the stimulable phosphor) which has been exposed to a radiation passing through an object such as a human body to have a radiation image of the object stored on the stimulable phosphor sheet, and the stimulated emission emitted from the stimulable phosphor sheet is photoelectrically detected, thereby obtaining an image signal (a radiation image signal). A radiation image of the object is reproduced as a visible image on the basis of the radiation image signal on a recording medium such as a photographic film or a display such as a CRT. See, for instance, Japanese Unexamined Patent Publications Nos. 55(1980)-12429, 56(1981)-11395 and 56(1981)-11397.

The stimulable phosphor sheet generally comprises a protective layer which protects the surface of the stimulable phosphor layer on the side from which the stimulated emission is detected and a support which supports the stimulable phosphor layer from the side opposite to the protective layer, and is flexible. As a system for reading out radiation image information from the stimulable phosphor sheet, there have been known a point scan system in which the stimulating light is focused in a spot on the surface of the stimulable phosphor sheet, the spot is caused to scan the surface of the stimulable phosphor sheet by the use of a scanning optical system comprising, for instance, a laser and a polygonal mirror while moving the stimulable phosphor sheet in a direction intersecting the direction of scan of the stimulating light spot, and stimulated emission emitted from the points of the stimulable phosphor sheet is led to a photomultiplier by a light guide such as of acrylic resin, and a line scan system in which a linear stimulating light beam is projected onto the stimulable phosphor sheet to irradiate a line-like portion extending in one direction while moving the stimulable phosphor sheet in a direction intersecting said one direction and stimulated emission emitted from the line-like portions is imaged on a line sensor having an array of photoelectric convertor elements.

As a means for imaging the stimulated emission in the line scan system, for instance, an imaging lens comprising an array of a plurality of refractive index profile type lenses may be employed. The imaging lens images the line-like portion of the stimulable phosphor sheet as an erected image of natural size, whereby the line sensor detects the amount of stimulated emission emitted from the line-like portion.

In this case, it is necessary to keep the distance between the surface of the stimulable phosphor layer and the imaging lens in a range where a relation necessary for the imaging lens to image the surface of the stimulable phosphor layer on the line sensor (this relation will be referred to as "imaging relation", hereinbelow) can be held.

That is, when the distance between the surface of the stimulable phosphor layer and the imaging lens changes, the imaging lens can come to be disabled from imaging a particular part of the surface of the stimulable phosphor layer on a predetermined photoelectric convertor element of the line sensor, which can result in reduction of the amount of stimulated emission detected by the predetermined photoelectric convertor element due to poor light collecting efficiency and/or generation of noise in the radiation image information obtained due to stimulated emission impinging upon a wrong photoelectric convertor element.

This problem may be overcome by supporting the supported surface of the stimulable phosphor layer (the surface opposite to the surface of the stimulable phosphor layer on the side from which the stimulated emission is detected (will be referred to as "the detected surface", hereinbelow)) by a rigid support so that the detected surface of the stimulable phosphor layer conforms to the shape of the surface of the support, whereby the distance between the detected surface of the stimulable phosphor layer and the imaging lens is kept constant.

However, even if the supported surface of the stimulable phosphor layer is supported by a rigid support, the detected surface cannot always conform to the shape of the surface of the support, and at the same time, the detected surface of the stimulable phosphor layer actually has unevenness and/or undulation and accordingly, it is difficult to move the stimulable phosphor sheet keeping constant the distance between the detected surface of the stimulable phosphor layer and the imaging lens.

SUMMARY OF THE INVENTION

In view of the foregoing observations and description, the primary object of the present invention is to provide a radiation image read-out method and a radiation image read-out apparatus which can read out the image recorded on the stimulable phosphor sheet more accurately than conventional methods and conventional apparatuses, and to provide a stimulable phosphor sheet suitable for the method and the apparatus.

In accordance with a first aspect of the present invention, there is provided a radiation image read-out method in which a stimulable phosphor sheet comprising a stimulable phosphor layer in contact with a protective layer which is rigid and transparent is used, stimulating light is projected onto the stimulable phosphor sheet from the protective layer side, stimulated emission emitted from the stimulable phosphor layer upon exposure to the stimulating light is detected by imaging the stimulated emission on a line sensor by an imaging lens from the protective layer side while moving the stimulable phosphor sheet relatively to the line sensor in a direction intersecting the direction in which the line sensor extends.

In accordance with a second aspect of the present invention, there is provided a radiation image read-out apparatus comprising a stimulable phosphor sheet having a stimulable phosphor layer in contact with a protective layer which is rigid and transparent, a stimulating light projecting means which projects stimulating light onto the stimulable phosphor sheet from the protective layer side, a detecting means which detects stimulated emission emitted from the stimulable phosphor layer upon exposure to the stimulating light by imaging the stimulated emission on a line sensor by an imaging lens from the protective layer side, and a conveyor means which moves the stimulable phosphor sheet relatively to the detecting means in a direction intersecting the direction in which the line sensor extends.

It is preferred that the stimulable phosphor sheet be conveyed relatively to the detecting means by the conveyor means so that the surface profile of the surface of the stimulable phosphor layer facing the protective layer is positioned within the range of the focal depth of the imaging lens.

In accordance with a third aspect of the present invention, there is provided a stimulable phosphor sheet comprising a stimulable phosphor layer and a protective layer, stimulating light being projected onto the stimulable phosphor layer from the protective layer side and stimulated emission emitted from the stimulable phosphor layer upon exposure to the stimulating light being detected by a line sensor through an imaging lens from the protective layer side, wherein the improvement comprises that the protective layer is formed of a rigid transparent material and the stimulable phosphor layer is in contact with the protective layer.

It is preferred that the stimulable phosphor layer be in contact with the protective layer at a plurality of discontinuous contact areas.

It is preferred that the surface of the stimulable phosphor layer facing the protective layer be within the range of ±100 µm in surface profile error.

It is preferred that the surface of the stimulable phosphor layer facing the protective layer be in the range of not smaller than 0.05 µm and not larger than 5 µm in center line surface roughness.

It is preferred that the protective layer be in the range of not smaller than 0.2 mm and not larger than 10 mm in thickness.

The stimulable phosphor layer may be pressed toward the protective layer from the side opposite to the protective layer by an elastic member so that the surface of the stimulable phosphor layer facing the protective layer is brought into contact with the protective layer.

The surface of the stimulable phosphor layer facing the protective layer may be bonded to the surface of the protective layer facing the stimulable phosphor layer by contact bonding under heat.

The surface of the stimulable phosphor layer facing the protective layer may be in direct contact with the protective layer by way of contact areas or may be in indirect contact with the protective layer by an intervenient such as adhesive. In the latter case, it is necessary that the surface of the stimulable phosphor layer is caused to conform to the surface of the protective layer by way of the intervenient.

The term "surface profile" as used here means a profile of the surface including shape, undulation, roughness and the like.

The expression "the focal depth of the imaging lens" as used here means an acceptable range of error in setting the distance between a light emitting surface emitting a given amount of light and the imaging lens with the reduction of light received by a light receiving surface held within 15% of that when the light emitting surface is precisely imaged on the light receiving surface by the imaging lens.

The term "surface profile error" as used here means an error from an optimal profile based on designing (that is, the total of an error in shape, an error in surface undulation, an error in surface roughness and the like). The "optimal profile" means a profile precisely imaged on the line sensor by the imaging lens. The surface profile error is represented by a plus error and a minus error from the optimal profile.

The stimulable phosphor layer may be in contact with the protective layer by way of filler with a void formed between the stimulable phosphor layer and the protective layer.

The filler may be positioned on a coating layer formed on the stimulable phosphor layer and/or the protective layer. In this case, it is preferred that the thickness of the coating layer be in the range of not smaller than 0.1 µm and not larger than 20 µm, and the particle diameter of the filler be in the range of not smaller than 0.2 µm and not larger than 50 µm.

As the filler, short fiber or beads of glass, polymer or the like can be employed.

The coating layer may be formed by applying a coating solution to the stimulable phosphor layer and/or the protective layer.

That the filler is positioned on a coating layer means that the filler is positioned on the coating layer to project at least partially from the surface of the coating layer so that a void is formed between the stimulable phosphor layer and the protective layer. The filler may be partially embedded in the coating layer.

In the radiation image read-out method and apparatus of the present invention, the protective layer side surface of the stimulable phosphor layer conforms to the surface of the protective layer which is rigid and accordingly has a highly precise surface profile following the surface profile of the protective layer. As a result, the distance between the surface of the stimulable phosphor layer facing the protective layer can be set more close to a predetermined optimal distance than in the conventional method and apparatus, whereby the whole region of the surface of the stimulable phosphor layer on which a radiation image is recorded can be more uniformly imaged on the line sensor and the radiation image recorded on the stimulable phosphor sheet can be more uniformly and more precisely read out.

The "optimal distance" is a distance at which the surface of the stimulable phosphor layer facing the protective layer can be precisely imaged on the line sensor by the imaging lens when the stimulated emission is to be detected.

The protective layer is generally bonded to the stimulable phosphor layer by adhesive or the like. Since the adhesive layer and the protective layer are higher than air in refractive index, there is a fear that the exit angle at which the stimulated emission emitted from the stimulable phosphor layer emanates from the stimulable phosphor sheet into the air can be greatly enlarged by the adhesive layer and the protective layer, which can reduce the amount of the stimulated emission impinging upon the imaging lens. However the contact areas at which the stimulable phosphor layer is actually in contact with the protective layer are very small as compared with the whole area of the stimulable phosphor layer and the protective layer and an air layer is formed over the major part of the stimulable phosphor layer and the protective layer, whereby enlargement of the exit angle at which the stimulated emission emitted from the stimulable phosphor layer emanates from the stimulable phosphor sheet into the air can be suppressed. As a result, the amount of the stimulated emission imaged on the line sensor through the imaging lens can be increased and the radiation image information recorded on the stimulable phosphor sheet can be read at a higher S/N.

When one of the stimulable phosphor sheet and the detecting means is conveyed by the conveyor means relatively to the other so that the surface profile of the surface of the stimulable phosphor layer facing the protective layer is positioned within the range of the focal depth of the imaging lens, the whole region of the surface of the stimulable phosphor layer on which a radiation image is recorded can be more uniformly imaged on the line sensor and the radiation image recorded on the stimulable phosphor sheet can be more uniformly and more precisely read out.

In the stimulable phosphor sheet of the present invention, the protective layer side surface of the stimulable phosphor layer conforms to the surface of the protective layer which is rigid and accordingly has a highly precise surface profile following the surface profile of the protective layer. As a result, the distance between the surface of the stimulable phosphor layer facing the protective layer can be set more close to a predetermined optimal distance than in the conventional method and apparatus, whereby the whole region of the surface of the stimulable phosphor layer on which a radiation image is recorded can be more uniformly imaged on the line sensor. Further since an air layer is formed over the major part of the stimulable phosphor layer and the protective layer, enlargement of the exit angle at which the stimulated emission emitted from the stimulable phosphor layer emanates from the stimulable phosphor sheet into the air can be suppressed, whereby, the amount of the stimulated emission imaged on the line sensor through the imaging lens can be increased.

Further, when the stimulable phosphor layer is in contact with the protective layer at a plurality of discontinuous contact areas, the distance between the surface of the stimulable phosphor layer facing the protective layer and the imaging lens can be set more uniformly and precisely.

Further, when the surface of the stimulable phosphor layer facing the protective layer is within the range of ±100 μm in surface profile error, the distance between the surface of the stimulable phosphor layer facing the protective layer and the imaging lens can be set more uniformly and precisely.

Further, when the surface of the stimulable phosphor layer facing the protective layer be in the range of not smaller than 0.05 μm and not larger than 5 μm in center line surface roughness, the distance between the surface of the stimulable phosphor layer facing the protective layer and the imaging lens can be set more precisely. Further, since a thin air layer is formed between the protective layer and the stimulable phosphor layer, stimulated emission which is emitted from the stimulable phosphor layer and emanates through the protective layer after reflected in the air layer is concentrated in a narrower region and the amount of stimulated emission imaged on the line sensor by the imaging lens can be increased.

Further, when the protective layer is in the range of not smaller than 0.2 mm and not larger than 10 mm in thickness, the protective layer can be rigid enough and becomes less apt to be deformed, whereby the distance between the surface of the stimulable phosphor layer facing the protective layer can be set more uniformly and more close to a predetermined optimal distance.

Further, when the stimulable phosphor layer is pressed toward the protective layer from the side opposite to the protective layer by an elastic member so that the surface of the stimulable phosphor layer facing the protective layer is brought into contact with the protective layer, the stimulable phosphor layer can be pressed against the protective layer under a uniform pressure over the entire area of the stimulable phosphor layer, whereby the distance between the surface of the stimulable phosphor layer facing the protective layer can be set more uniformly and more close to a predetermined optimal distance.

Further, when the surface of the stimulable phosphor layer facing the protective layer is bonded to the surface of the protective layer facing the stimulable phosphor layer by contact bonding under heat, the surface of the stimulable phosphor layer facing the protective layer is more surely kept following the surface of the protective layer facing the stimulable phosphor layer, whereby the distance between the surface of the stimulable phosphor layer facing the protective layer can be set more uniformly and more close to a predetermined optimal distance.

Further, when the stimulable phosphor layer is in contact with the protective layer by way of filler with a void formed between the stimulable phosphor layer and the protective layer, the aforesaid air layer can be more surely formed.

When the filler is positioned on a coating layer formed on the stimulable phosphor layer and/or the protective layer, the thickness of the coating layer is in the range of not smaller than 0.1 μm and not larger than 20 μm, and the particle diameter of the filler is in the range of not smaller than 0.2 μm and not larger than 50 μm, the filler particles can be well fixed, whereby stimulated emission emitted from the stimulable phosphor layer can be propagated with a high repeatability, and at the same time, the aforesaid air layer can be created in a thickness optimal to propagation of the stimulated emission.

Even if a coating layer is provided on the stimulable phosphor layer and/or the protective layer, the stimulated emission is reflected in random directions when emanating from the coating layer and emanates from the coating layer as light having a substantially Gaussian distribution. Accordingly, advantages of the aforesaid air layer can be obtained without taking into account refraction of the stimulated emission at the interfaces between the stimulable phosphor layer and the coating layer and between the coating layer and the protective layer.

DESCRIPTION OF THE PREFERRED EMBODIMENT

Figure 1:
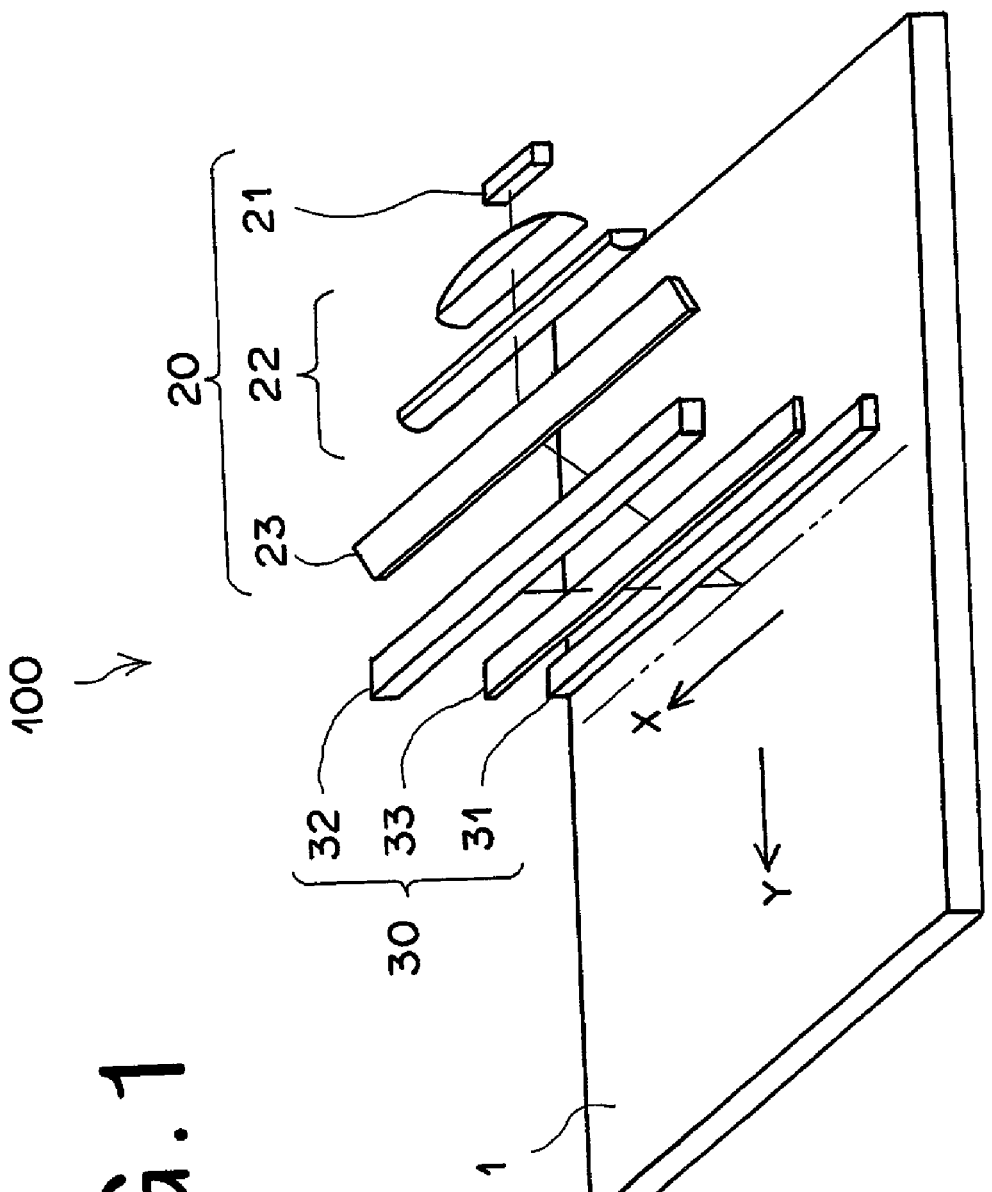
FIG. 1 is a schematic perspective view showing a radiation image read-out apparatus in accordance with a first embodiment of the present invention.
Figure 2:
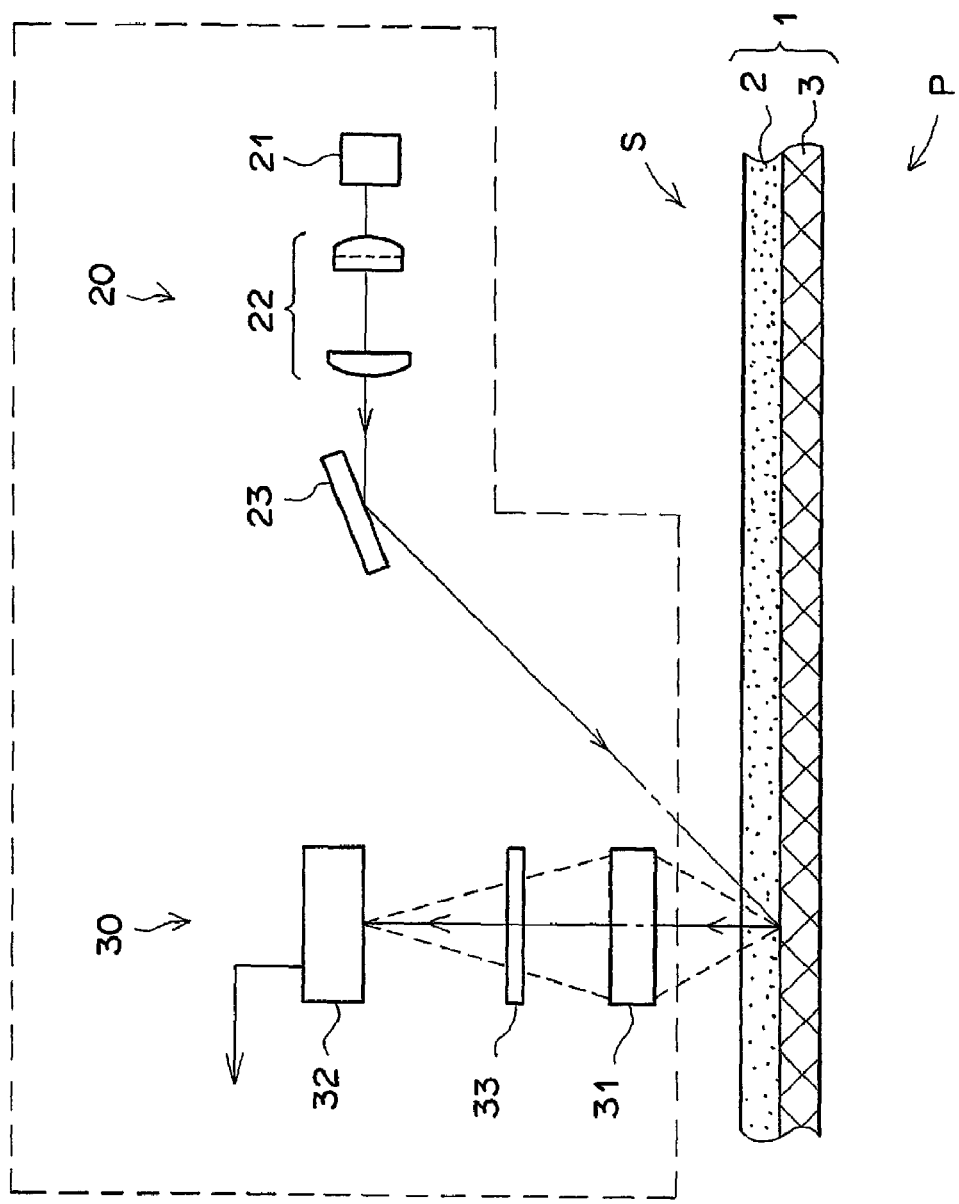
FIG. 2 is a cross-sectional view schematically showing the structure of the radiation image read-out apparatus and the stimulable phosphor sheet.

As shown in FIGS. 1 and 2, a radiation image read-out apparatus 100 in accordance with a first embodiment of the present invention comprises a stimulable phosphor sheet 1 having a stimulable phosphor layer 3 in contact with a protective layer 2 which is rigid and transparent. The radiation image read-out apparatus 100 further comprises a projecting means 20 which projects a stimulating light beam onto the stimulable phosphor sheet 1 from the protective layer side S (in the direction of arrow S in FIG. 2), a detecting means 30 which images stimulated emission emitted from the stimulable phosphor layer 3 upon exposure to the stimulating light beam on a line sensor 32 through an imaging lens 31 so that the line sensor 32 detects the stimulated emission, and a conveyor means (not shown) which moves one of the stimulable phosphor sheet 1 and the detecting means 30 relatively to the other in a direction intersecting the direction in which the line sensor 32 extends.

The stimulable phosphor sheet 1 comprises a stimulable phosphor layer 3 and a protective layer 2. The protective layer 2 is rigid and transparent, and the stimulable phosphor layer 3 is in contact with the protective layer 2.

The protective layer 2 may be of any material provided that it is rigid and transparent. For example, the protective layer 2 may be a transparent resin plate such as an acrylic plate. In this particular embodiment, a plane-parallel glass plate is employed as the protective layer 2.

The surface profile error of the surface of the protective layer 2 facing the stimulable phosphor layer 3 (the stimulable phosphor layer side P surface) is made not larger than ±100 μm, and the center line mean surface roughness of the surface of the stimulable phosphor layer 3 facing the protective layer 2 (the protective layer side S surface) is made in the range of not smaller than 0.05 μm and not larger than 5 μm. Further, the thickness of the protective layer 2 is made in the range of not smaller than 0.2 mm and not larger than 10 mm and the protective layer side S surface of the stimulable phosphor layer 3 is bonded to the stimulable phosphor layer side P surface of the protective layer 3 by contact bonding under heat.

The surface of the stimulable phosphor layer 3 and the surface of the protective layer 2 may be brought into contact with each other in any way without limited to contact bonding under heat.

The surface profile error of the aforesaid surface of the protective layer 2, the center line surface roughness of the aforesaid surface of the stimulable phosphor layer 3 and the thickness of the protective layer 2 need not be limited to in the ranges described above.

The projecting means 20 comprises a broad area laser 21 which emits a line stimulating light beam and an optical system 22 comprising a toric lens which condenses the line stimulating light beam emitted from the broad area laser 21 in a line-like area of the surface of the stimulable phosphor sheet 1 extending in the direction of arrow X by way of a reflecting mirror 23.

The detecting means 30 is further provided with a stimulating light cut filter 33 in addition to the imaging lens 31 and the line sensor 32, and the imaging lens 31 comprises a plurality of lens elements arranged in the direction of arrow X and images a line-like area irradiated by the line stimulating light beam of the surface of the stimulable phosphor layer 3 facing the protective layer 2. The line sensor 32 comprises a plurality of photoelectric convertor elements arranged in the direction of arrow X and detects the amount of stimulated emission emitted from the line-like area imaged by the imaging lens 31. The stimulating light cut filter 33 is inserted between the imaging lens 31 and the line sensor 32 and cuts stimulating light in the stimulated emission.

The projecting means 20 and the detecting means 30 are integrated with each other and are moved integrally with each other by the conveyor means (not shown).

Though not shown, the conveyor means comprises a guide rail which linearly guides the integrated projecting means 20 and the detecting means 30 in the direction of arrow Y perpendicular to the direction of arrow X not to tilt, and a drive means which moves the integrated projecting means 20 and the detecting means 30 along the guide rail.

The operation of the radiation image read-out apparatus 100 of this embodiment will be described, hereinbelow.

The stimulating light beam emitted from the broad area laser 21 travels through the condenser optical system 22 and is reflected by the reflecting mirror 23 to irradiate a line-like area of the surface of the stimulable phosphor layer 3 facing the protective layer 2. Stimulated emission emitted from the surface of the stimulable phosphor layer 3 upon exposure to the stimulating light beam is imaged on the line sensor 32 through the imaging lens 31 and is photoelectrically converted into an electric image signal. By executing these steps while conveying the integrated projecting means 20 and detecting means 30 in the direction of arrow Y, radiation image information recorded on the stimulable phosphor sheet 1 is read out.

The protective layer 2 is a rigid plane-parallel glass plate and the surfaces of the protective layer 2 are highly flat. The surface of the stimulable phosphor layer 3 facing the protective layer 2 is in contact with the surface of the protective layer 2 facing the stimulable phosphor layer 3 and follows the shape (surface profile) of the surface of the protective layer 2 facing the stimulable phosphor layer 3. Accordingly, the surface of the stimulable phosphor layer 3 facing the protective layer 2 has a high flatness (preciseness of the surface profile) equivalent to that of the surface of the protective layer 2 facing the stimulable phosphor layer 3. The integrated projecting means 20 and detecting means 30 are conveyed in the direction of arrow Y so that the surface profile of the surface of the stimulable phosphor layer 3 facing the protective layer 2 is positioned within the range of the focal depth of the imaging lens 31. Accordingly, the line-like area of the surface of the stimulable phosphor layer 3 which emits stimulated emission can be uniformly imaged on the line sensor 32 and the radiation image information recorded on the stimulable phosphor sheet 1 can be more uniformly and more precisely read out.

The mechanism that an air layer formed between the protective layer 2 and the stimulable phosphor layer 3 of the stimulable phosphor sheet 1 increases the amount of stimulated emission which is imaged on the line sensor 32 through the imaging lens 31 will be described, hereinbelow.

Figure 3:
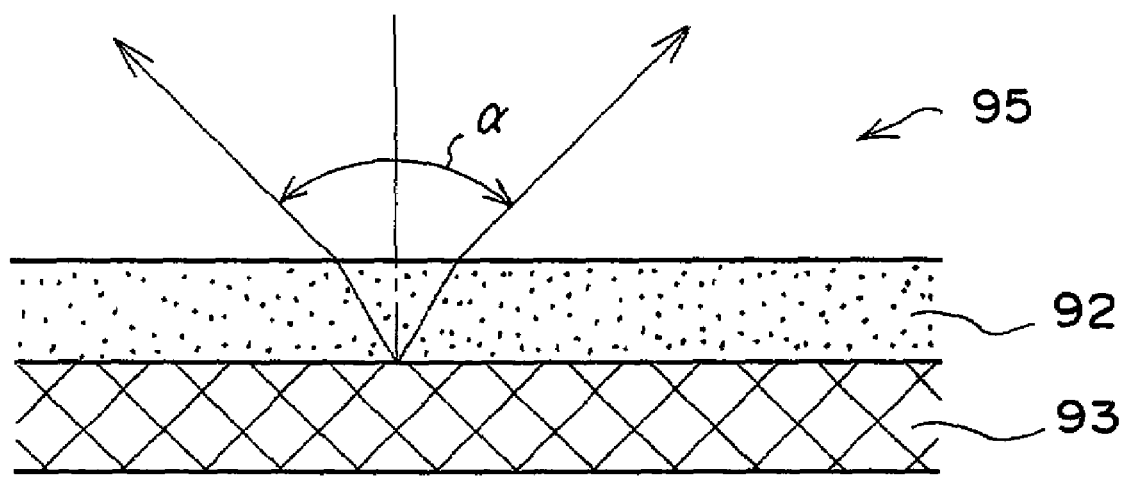
FIG. 3 is a view showing the state in which the stimulated emission emanates from the protective layer into the air when the stimulable phosphor sheet is provided with no air layer.

When the space between the protective layer and the stimulable phosphor layer is filled with liquid to purge air or the protective layer is bonded to the stimulable phosphor layer by adhesive or the like, since the adhesive layer and the liquid are higher than air in refractive index, the optical path of the stimulated emission emitted from the stimulable phosphor layer 93 (FIG. 3) is greatly bent when emanating from the protective layer 92 into the air 95 to provide a large exit angle of α as shown in FIG. 3.

Figure 4:
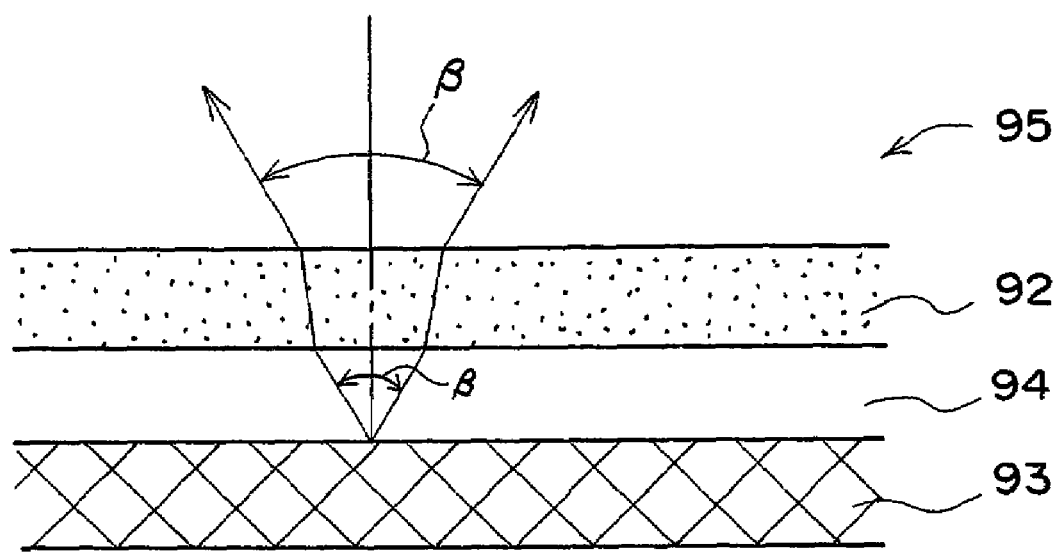
FIG. 4 is a view showing the state in which the stimulated emission emanates from the protective layer into the air when the stimulable phosphor sheet is provided with an air layer.

To the contrast, when an air layer 94 is formed between the protective layer and the stimulable phosphor layer, the stimulated emission emanates from the protective layer 92 into the air 95 at the same angle as that at which the stimulated emission emanates from the stimulable phosphor layer 93 into the air layer 94 and accordingly, the optical path of the stimulated emission emitted from the stimulable phosphor layer 93 (FIG. 3) is less bent when emanating from the protective layer 92 into the air 95 to provide a relatively small exit angle of β as shown in FIG. 4.

Figure 5:
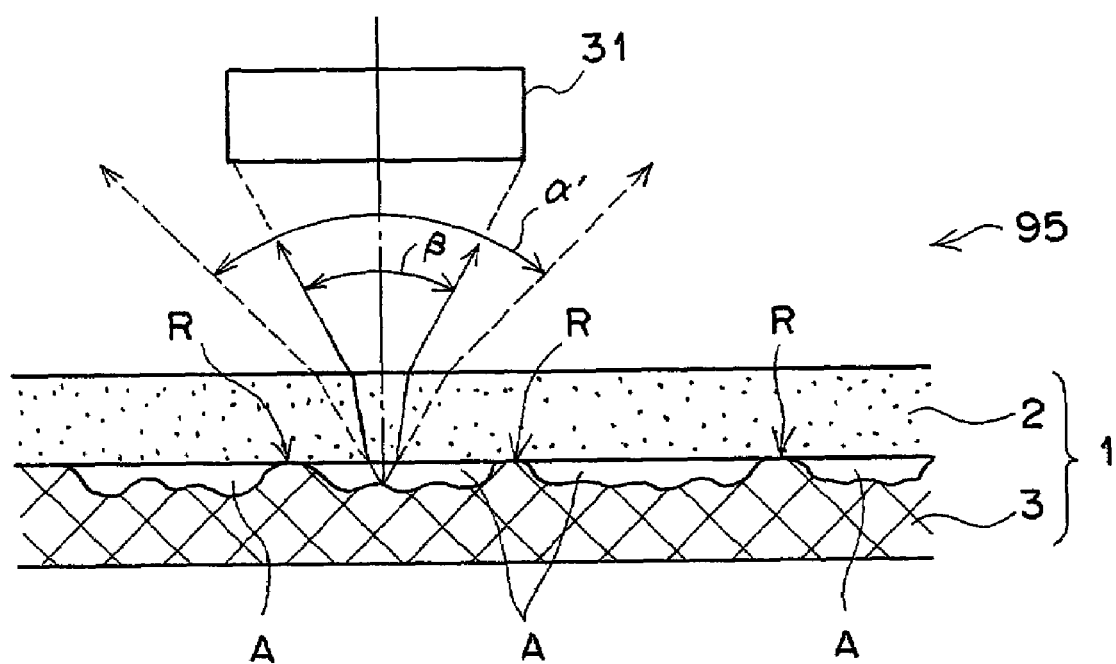
FIG. 5 is a view showing the state in which the stimulated emission emanates from the protective layer into the air when the stimulable phosphor layer and the protective layer are in contact with each other.

In the stimulable phosphor sheet 1 employed in the radiation image read-out apparatus 100 in accordance with the first embodiment of the present invention, the stimulable phosphor layer 3 is actually in contact with the protective layer 2 only at the contact areas R as shown in FIG. 5, and a thin air layer A is formed between the stimulable phosphor layer 3 and the protective layer 2 over the area but the contact areas A, whereby the stimulated emission emitted from the stimulable phosphor layer 3 emanates from the protective layer 2 into the air 95 at an exit angle of β. The exit angle of β is smaller than that α' at which the stimulated emission emitted from the stimulable phosphor layer 3 would emanate from the protective layer 2 into the air 95 if the air layer A is replaced by adhesive or the like as in the conventional stimulable phosphor sheet. As a result, the amount of the stimulated emission imaged on the line sensor 32 through the imaging lens 31 can be increased.

Stimulable phosphor sheets in accordance with various embodiments of the present invention and in accordance with various comparative examples were made in the following manners and these stimulable phosphor sheets were compared with each other in the following manners.

Stimulable Phosphor Sheet of a First Embodiment

Figure 6:
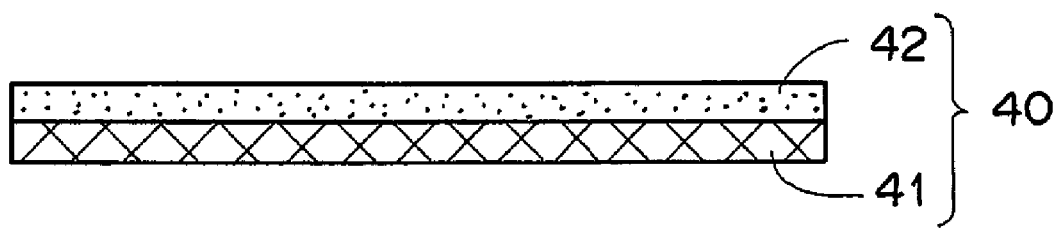
FIG. 6 is a view schematically showing the structure of the stimulable phosphor layer/support assembly employed in a stimulable phosphor sheet of a first embodiment of the present invention.

A mixture solution was prepared by dispersing a 20:1 mixture of a stimulable phosphor and a polyurethane resin in solvent. A stimulable phosphor layer was formed by applying the mixture solution to a support and drying the same. Then the stimulable phosphor layer thus obtained was bonded under heat to a support of polyethylene terephthalate provided with an adhesive layer by calendering, thereby obtaining a stimulable phosphor layer/support assembly 40 comprising a support 41 and a stimulable phosphor layer 42 as shown in FIG. 6.

The surface roughness Ra of the surface of the stimulable phosphor layer 42 of the stimulable phosphor layer/support assembly 40 was 0.18 μm.

Figure 7:
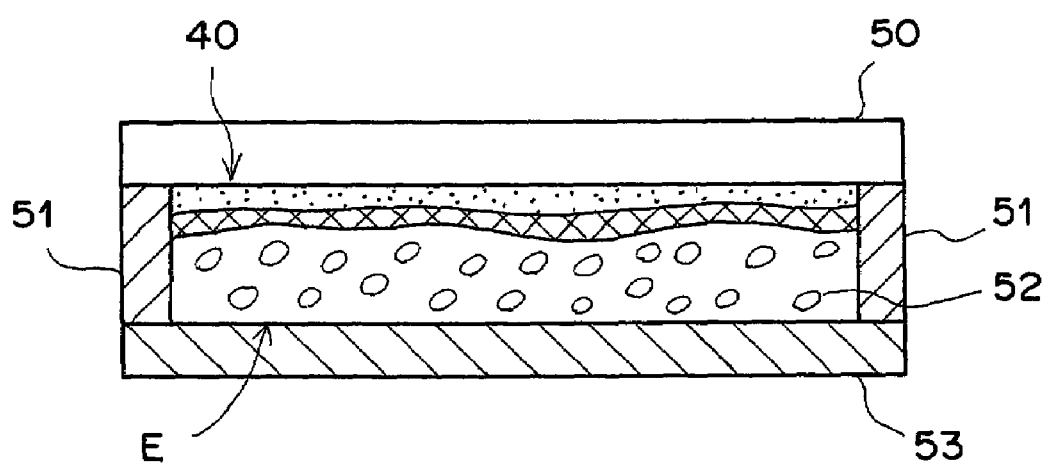
FIG. 7 is a view schematically showing the structure of the stimulable phosphor sheet of the first embodiment of the present invention.

Then an abraded rectangular plane plate 50 of soda glass which was 2 mm±20 μm in mean thickness was prepared as a protective layer. A side plate 51 was bonded to the lower side of the plane plate 50 by adhesive along each of four sides thereof so that the four side plates 51 defined a space E at a central portion of the lower side of the plane plate 50 as shown in FIG. 7. Then the stimulable phosphor layer/support assembly 40 was placed in the space E so that the surface of the plane plate 50 facing the space E faced the surface of the stimulable phosphor layer of the stimulable phosphor layer/support assembly 40, and an elastic urethane foam 52 was inserted into the space E so that the urethane foam 52 uniformly pressed the stimulable phosphor layer/support assembly 40 over the entire area thereof from the support side and the entire area of the surface of the stimulable phosphor layer 42 of the stimulable phosphor layer/support assembly 40 was brought into contact with the plane plate 50. Finally, the opening of the space was closed by a bottom plate 53.

Stimulable Phosphor Sheet of a Second Embodiment

A stimulable phosphor sheet of a second embodiment was made in the same manner as in the first embodiment except the following point. When bonding under heat (calendering) the stimulable phosphor layer 42 to the support 41 in order to make the stimulable phosphor layer/support assembly 40, a metal roller having irregularities on its surface was pressed against the stimulable phosphor layer 42 so that the irregularities on the surface of the metal roller were transferred to the stimulable phosphor layer 42. The metal roller was 2.4 μm in surface roughness (Ra) and 19.8 μm in Rmax. The temperature bonding under heat was 50° C., and the metal roller was pressed against the stimulable phosphor layer 42 at 46 kg/cm (linear pressure). The stimulable phosphor layer 42 thus obtained was 0.35 μm in surface roughness (Ra).

Stimulable Phosphor Sheet of a Third Embodiment

Figure 8:
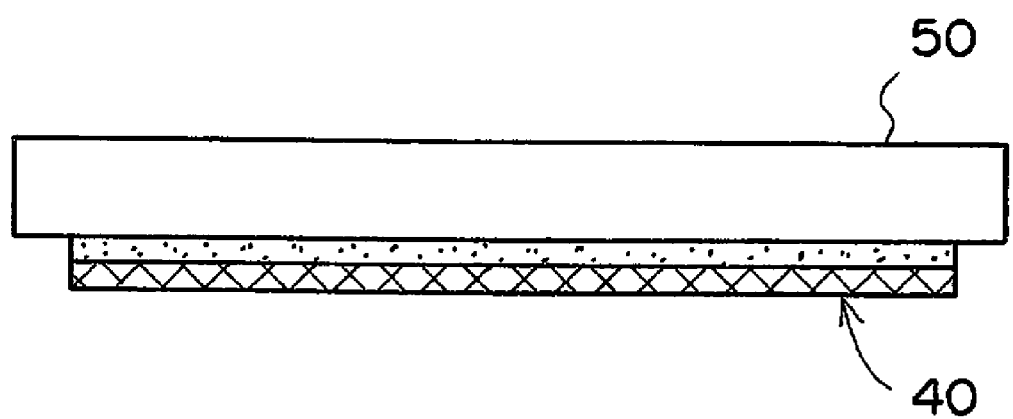
FIG. 8 is a view schematically showing the structure of a stimulable phosphor sheet in accordance with a third embodiment of the present invention.

A soda glass plane plate 50 the same as that employed in the first embodiment was heated to 80° C. and a stimulable phosphor layer/support assembly 40 formed in the same manner as in the first embodiment was bonded to the plane plate 50 under a pressure of 1 kg/cm (linear pressure) by a roller with the surface of the stimulable phosphor layer 42 facing the plane plate 50, thereby obtaining a stimulable phosphor sheet solely comprising a soda glass plane plate 50 and stimulable phosphor layer/support assembly 40 as shown in FIG. 8. In this embodiment, the plane plate 50 could be bonded to the stimulable phosphor layer 42 by binder contained in the stimulable phosphor layer 42.

Stimulable Phosphor Sheet of a Fourth Embodiment

A stimulable phosphor sheet of a fourth embodiment was made in the same manner as in the third embodiment except that the roller pressure was 10 kg/cm in linear pressure.

Stimulable Phosphor Sheet of a Fifth Embodiment

Figure 9:
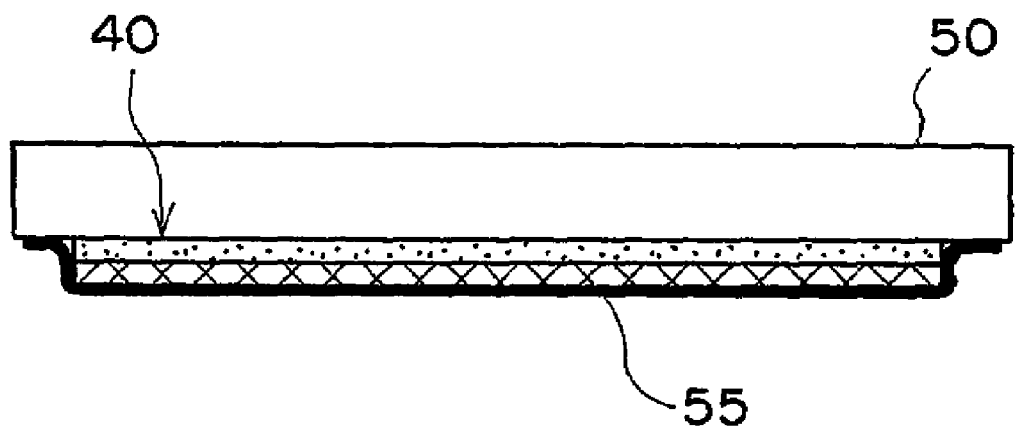
FIG. 9 is a view schematically showing the structure of a stimulable phosphor sheet in accordance with a fifth embodiment of the present invention.

A stimulable phosphor layer/support assembly 40 formed in the same manner as in the first embodiment was applied to a soda glass plane plate 50 the same as that employed in the first embodiment by adhesive tape with the surface of the stimulable phosphor layer 42 facing the plane plate 50, thereby obtaining a stimulable phosphor sheet solely comprising a soda glass plane plate 50 and stimulable phosphor layer/support assembly 40 as shown in FIG. 9.

Stimulable Phosphor Sheet of a Sixth Embodiment

Figure 10:
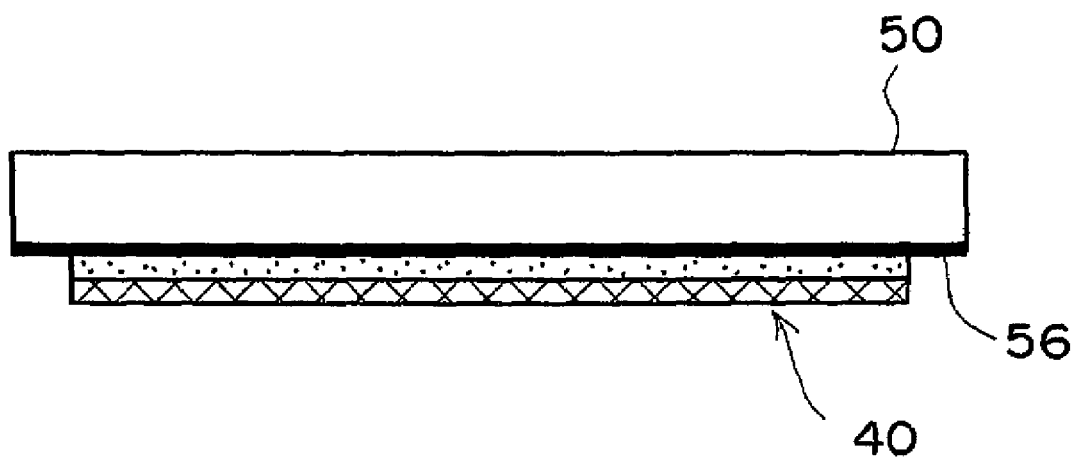
FIG. 10 is a view schematically showing the structure of a stimulable phosphor sheet in accordance with a sixth embodiment of the present invention.

A thermoplastic high polymer polyester resin layer 56 was formed on a soda glass plane plate 50 the same as that employed in the first embodiment as shown in FIG. 10, and a stimulable phosphor layer/support assembly 40 formed in the same manner as in the first embodiment was applied to the polyester resin layer 56 so that the surface of the stimulable phosphor layer 42 is in contact with the resin layer 56 and no air layer is formed between the stimulable phosphor layer 42 and the resin layer 56.

Stimulable Phosphor Sheet of a First Comparative Example (Not in Accordance with the Present Invention)

Figure 11:
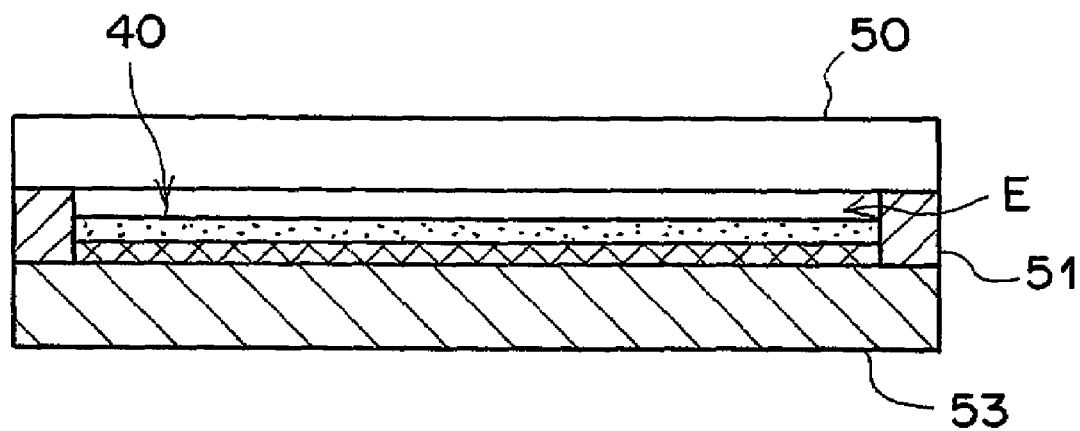
FIG. 11 is a view schematically showing the structure of a stimulable phosphor sheet in accordance with a first comparative example.

A stimulable phosphor sheet of a first comparative example was made in the same manner as in the first embodiment except that a space of 0.2 mm is formed between the plane plate 50 and the stimulable phosphor layer/support assembly 40 instead of inserting a urethane foam 52 in the space E as shown in FIG. 11.

The surface profile error (an error against an optimal plane) of the stimulable phosphor layer surface of the stimulable phosphor sheets of the first to sixth embodiments and the first comparative example were as shown in the following table 1. The surface profile error was measured by a non-contact laser displacement meter after the stimulable phosphor sheets were completed. Table 1 further shows the relative performance of the stimulable phosphor sheets of the first to sixth embodiments and the first comparative example.

TABLE 1

| | detected stimulated emission (relative amount) | surface profile error | contact between phosphor layer and protective layer | air layer |
|---|---|---|---|---|
| 1st embodiment | 100 | ±40 μm | exist | exist |
| 2nd embodiment | 102 | ±42 μm | exist | exist |
| 3rd embodiment | 98 | ±35 μm | exist | exist |
| 4th embodiment | 94 | ±37 μm | exist | exist |
| 5th embodiment | 100 | ±43 μm | exist | exist |
| 6th embodiment | 62 | ±38 μm | exist | no |
| 1st comparative example | 59 | ±102 μm | no | exist |

The stimulable phosphor sheets of the first to sixth embodiments were all within ±50 μm in surface profile error of the stimulable phosphor layer surface since the stimulable phosphor layer was in contact with the soda glass plane plate and the stimulable phosphor layer surface followed the surface of the plane plate in shape in the stimulable phosphor sheets of the first to sixth embodiments. To the contrast, the stimulable phosphor sheet of the first comparative example, where the stimulable phosphor layer was not in contact with the soda glass plane plate, was ±102 μm in surface profile error of the stimulable phosphor layer surface since the stimulable phosphor layer surface did not follow the surface of the plane plate in shape, and the shape of the surface of the bottom plate, fluctuation in thickness of the support and the stimulable phosphor layer and the like accumulated.

Experiment in which stimulated emission emitted from the stimulable phosphor layers of the stimulable phosphor sheets was detected will be described, hereinbelow.

Exposure of Each Stimulable Phosphor Sheet to a Radiation

With the surface of the soda glass plane plate masked by a lead mask having a slit, a radiation is projected onto each of the stimulable phosphor sheets of the first to sixth embodiments and the first comparative example from the plane plate side, thereby recording a latent image of a line on the stimulable phosphor layer.

Reading Out the Line Latent Image from the Stimulable Phosphor Sheet

The line latent image was read out by projecting a line stimulating light beam extending in the same direction as the line latent image onto the stimulable phosphor sheet with the lead mask removed therefrom.

The result of this experiment will be described with reference to the aforesaid table 1, hereinbelow.

In table 1, "detected stimulated emission" is the sum of the amounts of light detected by the respective photoelectric convertor elements forming the line sensor and is expressed in a relative value when that detected from the stimulable phosphor sheet of the first embodiment is taken as 100. In the case of the stimulable phosphor sheets of the first to fifth embodiments, where the stimulable phosphor layer is in contact with the soda glass plane plate and the surface profile error of the stimulable phosphor layer surface is in the range of ±35 μm to ±43 μm and an air layer is formed between the stimulable phosphor layer and the soda glass plane plate, the "detected stimulated emission" was not smaller than 94 and not larger than 102 and was substantially equal to each other.

In the case of the stimulable phosphor sheet of the sixth embodiment, where the stimulable phosphor layer is in contact with the soda glass plane plate by way of an adhesive layer and the surface profile error of the stimulable phosphor layer surface is in the range of ±38 μm and no air layer is formed between the stimulable phosphor layer and the soda glass plane plate, the "detected stimulated emission" was 62.

As can be understood from the description above, when an air layer was not formed between the stimulable phosphor layer and the soda glass plane plate, the amount of detected stimulated emission was reduced. This is for the reason described above.

In the case of the stimulable phosphor sheet of the first comparative example, where the stimulable phosphor layer is not in contact with the soda glass plane plate and the surface profile error of the stimulable phosphor layer surface is in the range of ±102 μm and an air layer is formed between the stimulable phosphor layer and the soda glass plane plate, the "detected stimulated emission" was 59.

The reason for the reduction of the amount of detected stimulated emission is that there are some areas positioned outside the focal depth of the imaging lens in the detected surface of the stimulable phosphor layer and accordingly the image of the stimulated emission emitting areas imaged on the line sensor is out of focus, whereby a part of the stimulated emission emitted from the stimulated emission emitting areas misses the line sensor.

The result of the experiment described above indicates that the amount of detected stimulated emission will be further reduced in the case of the conventional stimulable phosphor sheets, where Stimulable phosphor sheets, where the stimulable phosphor layer is in contact with the protective layer by way of filler so that a void is formed between the stimulable phosphor layer and the protective layer, will be described hereinbelow.

Stimulable Phosphor Sheet of a Seventh Embodiment

Figure 12:
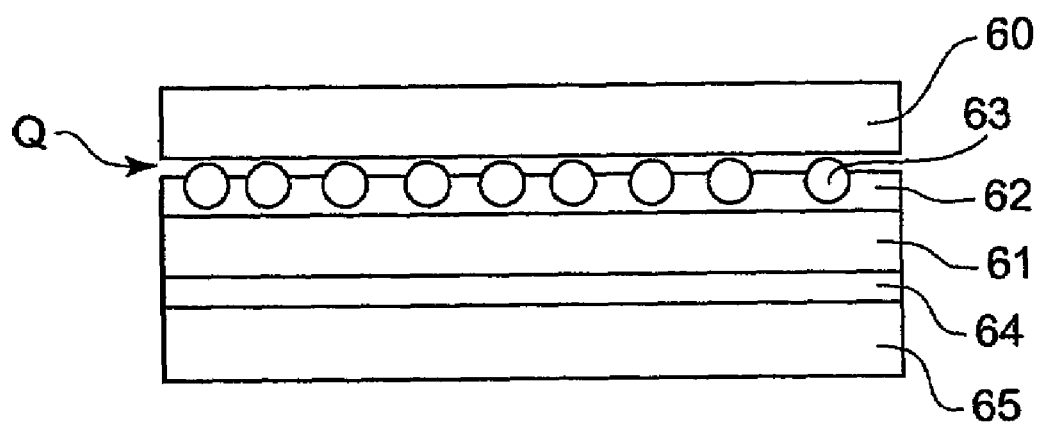
FIG. 12 is a view schematically showing the structure of a stimulable phosphor sheet in accordance with a seventh embodiment of the present invention.

A stimulable phosphor sheet of a seventh embodiment comprised a stimulable phosphor layer 61 and a protective layer 60 which were in contact with each other by way of filler 63 so that a void was formed between the stimulable phosphor layer 61 and the protective layer 60 as shown in FIG. 12. The filler 63 was positioned on a coating layer 62 formed on one side of the stimulable phosphor layer 61. A reflective layer 64 and a support 65 were superposed on the other side of the stimulable phosphor layer 61 in this order.

Stimulable Phosphor Layer 61

As a solution for forming the stimulable phosphor layer 61, the following phosphor and components were added to solvent and a solution of 4 Pa·s was prepared. The solution was applied to a temporary support in a width of 300 mm by a doctor blade and then dried. Thereafter the solution layer thus obtained was peeled off the temporary support and a few stimulable phosphor layers 300 μm thick were made.

As the phosphor, 1000 g of a 5:5 blend (by weight) of 14-hedral phosphor (BaFBr$_{0.05}$I$_{0.15}$Eu$^{2+}$) 6 μm in mean diameter (Dm) and that 3 μm in mean diameter was used.

As the aforesaid components, the following materials were employed.

binder: 182 g, obtained by dissolving polyurethane elastomer (PANDEX T-5265H[solid]; Dainippon Ink And Chemicals Inc.) in methyl ethyl ketone to a solid content concentration of 13 wt % cross-linking agent: 3 g, polyisocyanate (Coronate HX [100% solid content], Nippon Polyurethane Industries Co., Ltd.) anti-yellow-discoloration agent 6.7 g, epoxy resin (Epikote #001[solid], Japan Epoxy Resins Co., Ltd.

coloring agent: 0.02 g, (ultramarine, SM-1, Daiichi kase kogyo Co., Ltd.)

As the solvent, 47 g of methyl ethyl ketone was employed.

As the temporary support, a polyethylene terephthalate sheet coated with a silicone release agent (190 μm thick) was employed.

These components were dispersed for thirty minutes at 10000 rpm by the use of a propeller mixer and a solution for forming the stimulable phosphor layer whose binder/phosphor ratio was 1/20 by weight was obtained.

Support with a Reflective Layer

Powder materials and solvent were added to a binder and a solution 2 to 3 Pa·s in viscosity was obtained. The solution was applied to a support (a polyethylene terephthalate sheet, Lumillar S-10, Toray Inc., 188 μm in thickness, 27 in typical haze) in a thickness of 100 mm, thereby obtaining a support with a reflective layer comprising a support provided with a reflective layer which was a conductive prime-coating layer.

As the binder, 100 g of soft acrylic resin (CRISCOAT P-1018GS[20% toluene solution]; Dainippon Ink And Chemicals Inc.) was employed.

As the powder material, 444 g of reflective material (high-purityalumina, UA-5105, Showa Denko) and 2.2 g of coloring agent (ultramarine, SM-1, Daiichi kasei kogyo Co., Ltd.) were employed.

As the solvent, 387 g of methyl ethyl ketone was employed.

Figure 13:
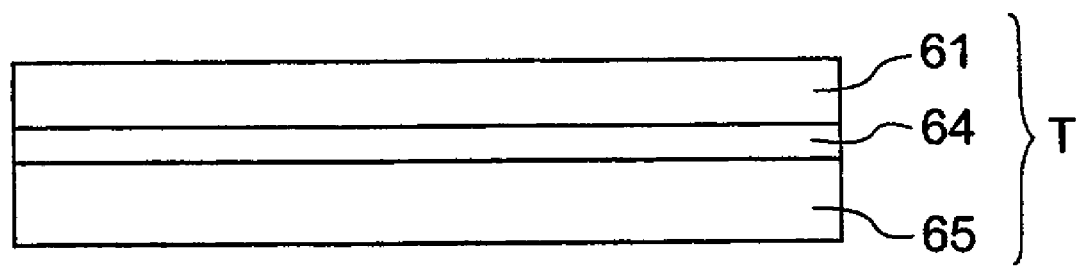
FIG. 13 is a view schematically showing the structure of a part of the stimulable phosphor sheet in accordance with the seventh embodiment of the present invention.

Production of Stimulable Phosphor Layer/Support Assembly by Hot-pressing the Stimulable Phosphor Layer and the Support with a Reflective Layer Several stimulable phosphor layer/support assemblies (indicated at T in FIG. 13) comprising a stimulable phosphor layer 61 and a support with a reflective layer comprising a support 65 provided with a reflective layer 64 which was a conductive prime-coating layer as shown in FIG. 13 were produced by the use of a calendering machine under the following conditions.

Calendering Conditions

The stimulable phosphor layer 61 was superposed on the reflective layer 64 of the support with a reflective layer. At this time, calendering was done with the stimulable phosphor layer 61 superposed on the support with a reflective layer so that the surface of the stimulable phosphor layer facing the temporary support when producing the stimulable phosphor layer 61 was faced toward the reflective layer of the assembly under the following conditions. Total load: 23 tons, upper roller temperature: 45° C., lower roller temperature: 45° C., feed rate: 0.3 m/min. By thermocompression by the calendering, the stimulable phosphor layer was completely welded to the support by way of the reflective layer 64 which was a conductive prime-coating layer, whereby stimulable phosphor layer/support assemblies were formed.

The packing density of the phosphor on the stimulable phosphor layer was 3.40 g/cm$^3$.

Figure 14:
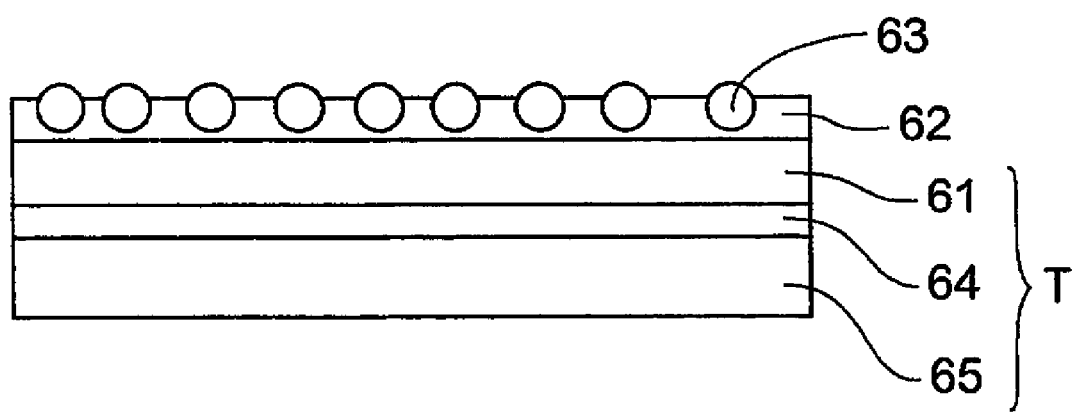
FIG. 14 is a view schematically showing the structure of another part of the stimulable phosphor sheet in accordance with the seventh embodiment of the present invention.

Lamination of the Stimulable Phosphor Layer/Support Assembly on the Coating Layer 62 where the Filler 63 was Fixed Components to be described later were added to solvent and a coating solution was prepared. The coating solution thus prepared was applied to the stimulable phosphor layer surface of the stimulable phosphor layer/support assembly made by calendering to form a coating layer 2 μm thick. Then the assembly was cut into pieces of 200 mm×250 mm, thereby obtaining stimulable phosphor layer/support assemblies with a coating layer with filler which comprised a support 65, a reflective layer 64, a stimulable phosphor layer 61 and a coating layer 62 with filler 63 superposed one on another in this order as shown in FIG. 14.

As the aforesaid components, the following materials were employed.

fluoroplastic (fluoroolefin-vinyl ether copolymer, Lumiflon LF-504X [30% xylene solution], Asahi Glass Inc.): 76 g cross-linking agent: 7.5 g (polyisocyanate, Sumidur N3500 [100% solid content], Sumitomo Bayer Urethane Co., Ltd.)

organic filler: 11 g (melamine-formaldehyde, Epostar S12 (mean particle diameter=1.2 μm), Nippon Shokubai Co., Ltd.)

coupling agent: 0.1 g (acetoalcoxy aluminum diisopropylate, Plenact AL-M, Ajinomoto Inc.)

catalyst: 0.25 g (dibutyltindilaurate, KS1260, Kyodo Chemical)

As the solvent, 38 g of methyl ethyl ketone was employed.

Since the coating solution coated on the stimulable phosphor layer/support assembly was dried and fixed with the organic filler therein floating to the surface of the solution, the coating layer had irregularities formed by the organic filler.

Lamination of a Glass Plate (Protective Layer) on the Stimulable Phosphor Layer/Support Assembly with a Coating Layer An abraded soda glass plate which was 2 mm±20 µm in mean thickness was prepared as a protective layer. Then the stimulable phosphor layer/support assembly with a coating layer including therein filler was laminated on the protective layer with the coating layer in contact with the protective layer and fixed to the protective layer along its four sides by Mylar tape, thereby obtaining a stimulable phosphor sheet of the seventh embodiment shown in FIG. 12. In this stimulable phosphor sheet, the stimulable phosphor layer 61 was laminated on the protective layer 60 intervening therebetween filler 63 so that a void Q was formed between the stimulable phosphor layer 61 and the protective layer 60.

The stimulable phosphor layer/support assembly with a coating layer including therein filler may be bonded to the protective layer by superposing the assembly on the protective layer with the coating layer in contact with the protective layer and passing them through laminating rolls whose surface temperatures are 90° C.

Stimulable Phosphor Sheet of an Eighth Embodiment

Figure 15:
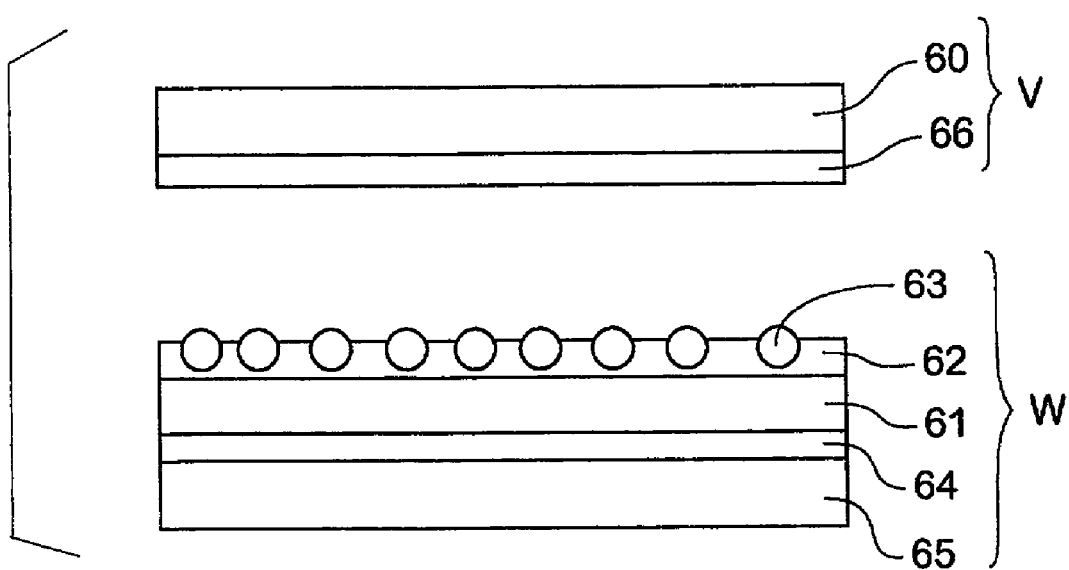
FIG. 15 is a view schematically showing the structure of a stimulable phosphor sheet in accordance with an eighth embodiment of the present invention.

A stimulable phosphor sheet of an eighth embodiment comprised a second coating layer 66 formed on a protective layer 60 (a protective layer/second coating layer assembly indicated at V in FIG. 15) and a stimulable phosphor layer/support assembly with a first coating layer including therein filler (indicated at W in FIG. 15) as produced in the manner described above in conjunction with the seventh embodiment. The former was laminated on the former with the first and second coating layers opposed to each other.

Formation of the Second Coating Layer 66 on the Protective Layer 60 and Production of the Stimulable Phosphor Sheet A stimulable phosphor sheet of an embodiment 8-1 was produced in the following manner.

A binder solution was applied in a thickness of 2 µm to an abraded soda glass plate which was 2 mm±20 µm in mean thickness, there by preparing a protective layer with a second coating layer. Then the protective layer with a second coating layer was bonded to a stimulable phosphor layer/support assembly with a first coating layer including therein filler with the first and second coating layers opposed to each other.

A stimulable phosphor sheet of an embodiment 8-2 was produced in the following manner.

A binder solution was applied in a thickness of 2 µm to an abraded soda glass plate which was 2 mm±20 µm in mean thickness to form a binder layer, and further applied to the binder layer to a thickness of 5 µm, thereby preparing a protective layer with a second coating layer. Then the protective layer with a second coating layer was bonded to a stimulable phosphor layer/support assembly with a first coating layer including therein filler with the first and second coating layers opposed to each other, thereby obtaining a stimulable phosphor sheet of an embodiment 8-2.

As the binder solution, 10 g of a solution obtained by dissolving Vylon 300 (unsaturated polyester resin made by Toyobo Inc.) in MEK [15 wt % solid content] was employed.

The stimulable phosphor layer/support assembly with a first coating layer including therein filler may be bonded to the protective layer with a second coating layer by superposing the former on the latter with the coating layers opposed to each other and passing them through laminating rolls whose surface temperatures are 90° C.

Stimulable Phosphor Sheet of a Ninth Embodiment

Figure 16:
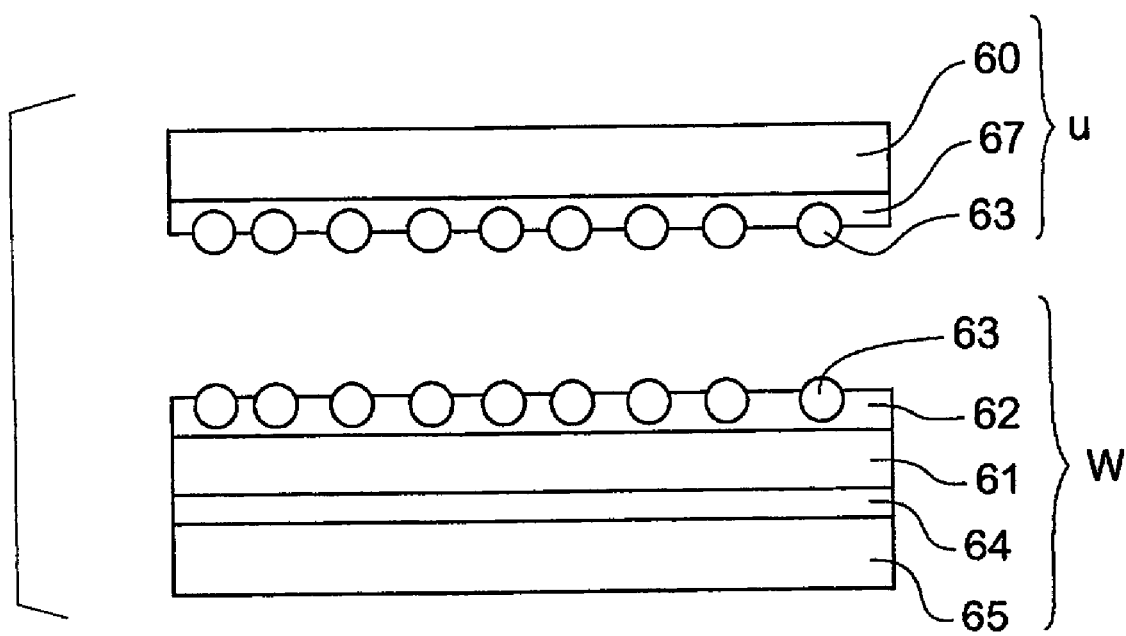
FIG. 16 is a view schematically showing the structure of a stimulable phosphor sheet in accordance with a ninth embodiment of the present invention.

A stimulable phosphor sheet of a ninth embodiment comprised a second coating layer 67 with filler formed on a protective layer 60 (a protective layer/second coating layer assembly with filler indicated at U in FIG. 16) and a stimulable phosphor layer/support assembly with a first coating layer including therein filler (indicated at W in FIG. 16) as produced in the manner described above in conjunction with the seventh embodiment. The former was laminated on the former with the first and second coating layers opposed to each other.

Formation of the Second Coating Layer 66 on the Protective Layer 60 and Production of the Stimulable Phosphor Sheet A stimulable phosphor sheet of an embodiment 9-1 was produced in the following manner.

An adhesive solution with filler (a mixture of an adhesive solution, organic filler and solvent) was applied in a thickness of 2 µm to an abraded soda glass plate which was 2 mm±20 µm in mean thickness, thereby preparing a protective layer with a second coating layer with filler. Then the protective layer with a second coating layer with filler was bonded to a stimulable phosphor layer/support assembly with a first coating layer including therein filler with the first and second coating layers opposed to each other.

A stimulable phosphor sheet of an embodiment 9-2 was produced in the following manner.

The same adhesive solution was applied in a thickness of 2 µm to an abraded soda glass plate which was 2 mm±20 µm in mean thickness to form an adhesive layer, and further applied to the adhesive layer to a thickness of 5 µm, thereby preparing a protective layer with a second coating layer. Then the protective layer with a second coating layer with filler was bonded to a stimulable phosphor layer/support assembly with a first coating layer including therein filler with the first and second coating layers opposed to each other, thereby obtaining a stimulable phosphor sheet of an embodiment 9-2.

Since the second coating layer formed by the adhesive solution has adhesion, the former and the latter can be bonded without use of additional adhesive material.

As the adhesive solution, 10 g of a solution obtained by dissolving Vylon 300 (unsaturated polyester resin made by Toyobo Inc.) in MEK [15 wt % solid content] was employed.

As the organic filler, 10 g of EPOSTAR S12 (mean particle diameter=1.2 µm, melamine-formaldehyde, Nippon Shokubai Co., Ltd.) was employed.

As the solvent, 20 g of methyl ethyl ketone was employed.

The stimulable phosphor layer/support assembly with a first coating layer including therein filler may be bonded to the protective layer with a second coating layer with filler by superposing the former on the latter with the coating layers opposed to each other and passing them through laminating rolls whose surface temperatures are 90° C.

Stimulable Phosphor Sheet of a Tenth Embodiment

A stimulable phosphor sheet of a tenth embodiment was made in the same manner as in the seventh embodiment except that 22 g of inorganic filler (alumina particles 2 µm in mean particle diameter: Sumicorundum AA-2, Sumitomo Chemical Inc.) was employed in place of organic filler.

Stimulable Phosphor Sheet of an Eleventh Embodiment

A stimulable phosphor sheet of an eleventh embodiment was made in the same manner as in the seventh embodiment except that 22 g of micro glass beads (5 to 7 μm in mean particle diameter: MB-10, Toshiba-Ballotini Inc.) was employed.

Stimulable Phosphor Sheet of a Second Comparative Example

Figure 17:
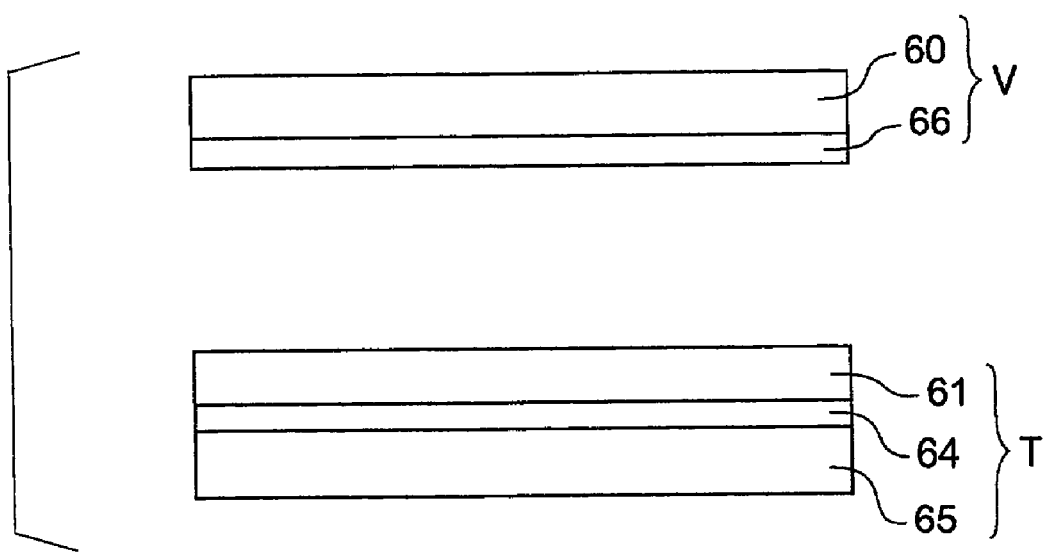
FIG. 17 is a view schematically showing the structure of a stimulable phosphor sheet in accordance with a second comparative example.

A stimulable phosphor sheet of a second comparative example was produced. The stimulable phosphor sheet of a second comparative example comprised a second coating layer 66 without filler formed on a protective layer 60 (a protective layer/second coating layer assembly without filler indicated at V in FIG. 17) and a stimulable phosphor layer/support assembly with a first coating layer without filler (indicated at T in FIG. 17) as produced in the manner described above in conjunction with the eighth embodiment. The former was laminated on the former with the first and second coating layers opposed to each other.

In this example, the stimulable phosphor layer/support assembly with a first coating layer and the protective layer/second coating layer assembly were in optical contact with each other.

Stimulable Phosphor Sheet of a Third Comparative Example

A stimulable phosphor sheet of a third comparative example was produced in the following manner. A stimulable phosphor layer/support assembly formed in the seventh embodiment (indicated at T in FIG. 13) was separated between the reflective layer 64 and the stimulable phosphor layer 61 and only a stimulable phosphor layer was taken as a stimulable phosphor sheet of the third comparative example.

Evaluation

Production of Evaluation Samples

The stimulable phosphor sheets of the seventh to eleventh embodiments and second and third comparative examples were separated between the reflective layer and the stimulable phosphor layer and the stimulable phosphor layer side piece of each stimulable phosphor sheet was taken as the evaluation sample.

Measurement of the Evaluation Samples

Figure 18:
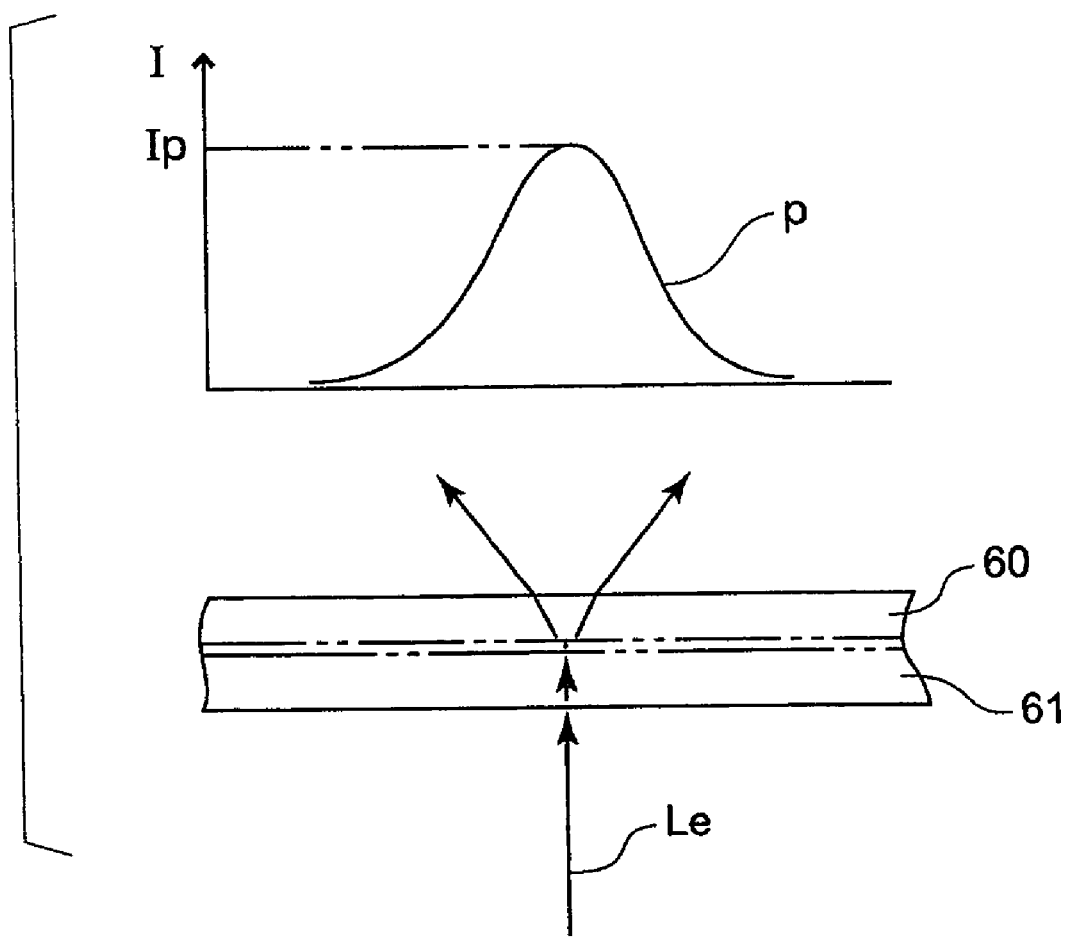
FIG. 18 is a schematic view for illustrating the measurement of the evaluation samples.

He—Ne laser beam Le was caused to impinge upon each evaluation sample from the side of the stimulable phosphor layer 61 and a peak intensity Ip in an intensity profile P of the laser beam Le emanating from the evaluation sample through the protective layer 60 was measured as shown in FIG. 18. A peak intensity Io in an intensity profile P of the laser beam Le was measured without any sample. Then a peak intensity ratio I(=Ip/Io), that is, the ratio of the peak intensity obtained with the evaluation sample to that obtained without any evaluation sample was calculated.

The result was as shown in the following table 2.

TABLE 2

| embodiment | I (=Ip/Io) | Ra of coating layer with filler |
|---|---|---|
| 7 | 6.50% | |
| 8-1 | 6.30% | 1st coating layer: 0.6 μm |
| 8-2 | 4.50% | 1st coating layer: 0.6 μm |
| 9-1 | 6.50% | 1st coating layer: 0.6 μm<br>2nd coating layer: 0.5 μm |
| 9-2 | 5.30% | 1st coating layer: 0.6 μm<br>2nd coating layer: 0.2 μm |
| 10 | 6.40% | coating layer: 0.8 μm |
| 11 | 6.40% | coating layer: 0.3 μm |
| 1st comparative example | 3.20% | — |
| 2nd comparative example | 7.70% | — |

As can be understood from table 2, in the evaluation sample of the second comparative example, where the stimulable phosphor layer and the protective layer were in optical contact with each other, there was a great reduction of the peak intensity ratio as compared with the third comparative example solely consisting of stimulable phosphor layer. To the contrast, in the evaluation samples of the seventh to eleventh embodiments, the reduction of the peak intensity ratio was smaller.

Figure 19A:
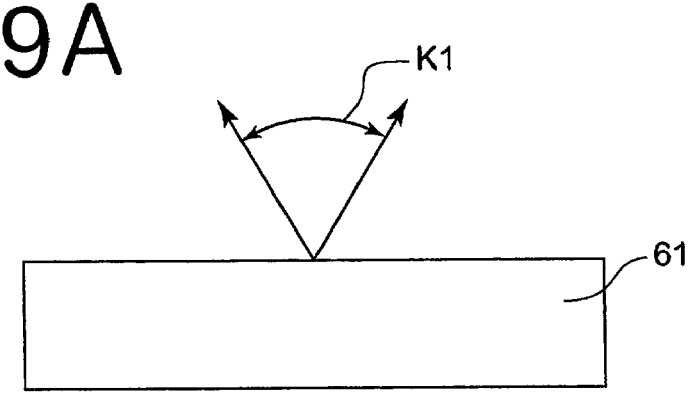
FIGS. 19A to 19C are views for illustrating the effect of the void formed between the protective layer and the stimulable phosphor layer by the filler.
Figure 19B:
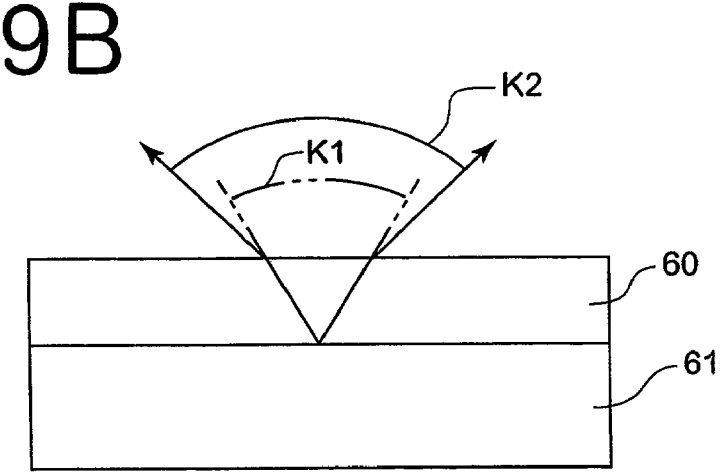
Figure 19C:
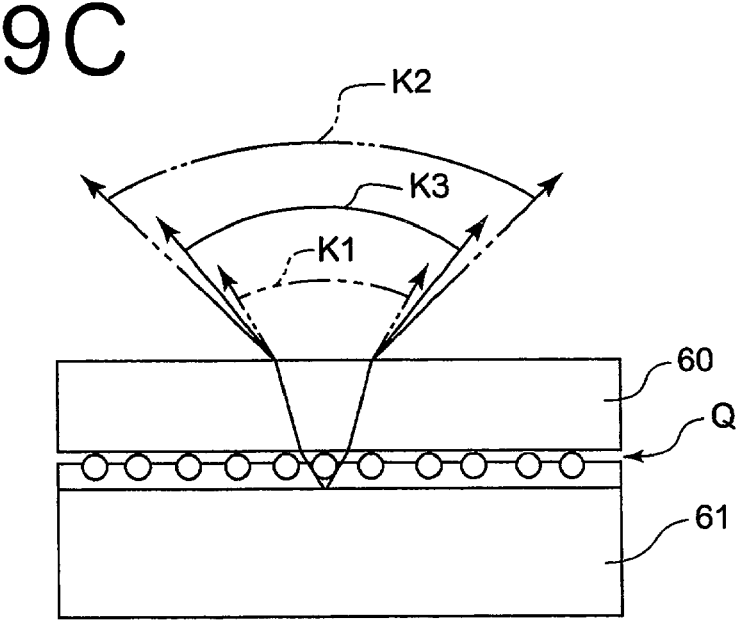

That is, in the evaluation sample of the third comparative example consisting solely of the stimulable phosphor layer 61, the laser beam emanating therefrom diverges as indicated by K1 in FIG. 19A. To the contrast, in the evaluation sample of the second comparative example, where the stimulable phosphor layer and the protective layer were in optical contact with each other, the laser beam emanating therefrom is greatly refracted in the direction parallel to the surface of the protective layer to diverge more widely as indicated by K2 in FIG. 19B, which results in a great reduction of the peak intensity ratio. In the evaluation samples of the seventh to eleventh embodiments, where the stimulable phosphor layer 61 is in contact with the protective layer 60 by way of filler so that a void is formed therebetween, the laser beam emanating therefrom is less refracted in the direction parallel to the surface of the protective layer to diverge less widely as indicated by K3 in FIG. 19C, which results in a smaller reduction of the peak intensity ratio.

The surface roughness Ra of the layer added with a spacer such as filler is preferably in the range of about 0.2 to 20 μm, and more preferably in the range of about 0.5 to 5 μm.

What is claimed is:

1. A radiation image read-out method, comprising:
   using a stimulable phosphor sheet;
   projecting stimulating light onto the stimulable phosphor sheet from the protective layer side; and
   detecting stimulated emission emitted from the stimulable phosphor layer upon exposure to the stimulating light by imaging the stimulated emission on a line sensor by an imaging lens from the protective layer side while moving the stimulable phosphor sheet relatively to the line sensor in a direction intersecting the direction in which the line sensor extends,
   wherein the stimulable phosphor sheet comprises a stimulable phosphor layer and a protective layer, the protective layer is formed of a rigid transparent material and the stimulable phosphor layer is in contact with the protective layer, and
   wherein the stimulable phosphor layer is in contact with the protective layer at a plurality of discontinuous contact areas.

2. A radiation image read-out apparatus, comprising:
   a stimulable phosphor sheet;
   a stimulating light projecting means which projects stimulating light onto the stimulable phosphor sheet from the protective layer side;
   a detecting means which detects stimulated emission emitted from the stimulable phosphor layer upon exposure to the stimulating light by imaging the stimulated emission on a line sensor by an imaging lens from the protective layer side; and
   a conveyor means which moves the stimulable phosphor sheet relatively to the detecting means in a direction intersecting the direction in which the line sensor extends,
   wherein the stimulable phosphor sheet comprises a stimulable phosphor layer and a protective layer, the protective layer is formed of a rigid transparent material and the stimulable phosphor layer is in contact with the protective layer, and wherein the stimulable phosphor layer is in contact with the protective layer at a plurality of discontinuous contact areas.

3. A radiation image read-out apparatus as defined in claim 2 in which the conveyor means conveys the stimulable phosphor sheet relatively to the detecting means so that the surface profile of the surface of the stimulable phosphor layer facing the protective layer is positioned within the range of the focal depth of the imaging lens.

4. A stimulable phosphor sheet comprising a stimulable phosphor layer and a protective layer, stimulating light being projected onto the stimulable phosphor layer from the protective layer side and stimulated emission emitted from the stimulable phosphor layer upon exposure to the stimulating light being detected by a line sensor through an imaging lens from the protective layer side, wherein the improvement comprises that the protective layer is formed of a rigid transparent material and the stimulable phosphor layer is in contact with the protective layer, and wherein the stimulable phosphor layer is in contact with the protective layer at a plurality of discontinuous contact areas.

5. A stimulable phosphor sheet as defined in claim 4 in which the protective layer is in the range of not smaller than 0.2 mm and not larger than 10 mm in thickness.

6. A stimulable phosphor sheet as defined in claim 4 comprising:

an elastic member, wherein the elastic member presses the stimulable phosphor layer toward the protective layer from the side opposite to the protective layer so that the surface of the stimulable phosphor layer facing the protective layer is brought into contact with the protective layer.

7. A stimulable phosphor sheet as defined in claim 4 in which the surface of the stimulable phosphor layer facing the protective layer is bonded to the surface of the protective layer facing the stimulable phosphor layer by contact bonding under heat.

8. The stimulable phosphor sheet of claim 4 wherein the stimulable phosphor layer is bonded to the protective layer.

9. The stimulable phosphor sheet of claim 4, comprising:

an adhesive tape, wherein the adhesive tape attaches the stimulable phosphor layer to the protective layer so that their respective surfaces are in contact with the other.

10. A stimulable phosphor sheet comprising a stimulable phosphor layer and a protective layer, stimulating light being projected onto the stimulable phosphor layer from the protective layer side and stimulated emission emitted from the stimulable phosphor layer upon exposure to the stimulating light being detected by a line sensor through an imaging lens from the protective layer side, wherein the improvement comprises that the protective layer is formed of a rigid transparent material and the stimulable phosphor layer is in contact with the protective layer, and wherein the surface of the stimulable phosphor layer facing the protective layer is within the range of ±100 µm in surface profile error.

11. A stimulable phosphor sheet comprising a stimulable phosphor layer and a protective layer, stimulating light being projected onto the stimulable phosphor layer from the protective layer side and stimulated emission emitted from the stimulable phosphor layer upon exposure to the stimulating light being detected by a line sensor through an imaging lens from the protective layer side, wherein the improvement comprises that the protective layer is formed of a rigid transparent material and the stimulable phosphor layer is in contact with the protective layer, and wherein the surface of the stimulable phosphor layer facing the protective layer be in the range of not smaller than 0.05 µm and not larger than 5 µm in center line surface roughness.

12. A stimulable phosphor sheet comprising a stimulable phosphor layer and a protective layer, stimulating light being projected onto the stimulable phosphor layer from the protective layer side and stimulated emission emitted from the stimulable phosphor layer upon exposure to the stimulating light being detected by a line sensor through an imaging lens from the protective layer side, wherein the improvement comprises that the protective layer is formed of a rigid transparent material and the stimulable phosphor layer is in contact with the protective layer, wherein the stimulable phosphor layer is in contact with the protective layer by way of filler with a void formed between the stimulable phosphor layer and the protective layer, and wherein the filler is positioned on a coating layer formed on the stimulable phosphor layer and/or the protective layer.

13. A stimulable phosphor sheet as defined in claim 12 in which the thickness of the coating layer is in the range of not smaller than 0.1 µm and not larger than 20 µm, and the particle diameter of the filler is in the range of not smaller than 0.2 µm and not larger than 50 µm.

14. A radiation image read-out method in which a stimulable phosphor sheet comprising a stimulable phosphor layer in contact with a protective layer which is rigid and transparent is used, stimulating light is projected onto the stimulable phosphor sheet from the protective layer side, stimulated emission emitted from the stimulable phosphor layer upon exposure to the stimulating light is detected by imaging the stimulated emission on a line sensor by an imaging lens from the protective layer side while moving the stimulable phosphor sheet relatively to the line sensor in a direction intersecting the direction in which the line sensor extends, and further comprising:

providing the stimulable phosphor layer and the protective layer in direct physical contact with the stimulable phosphor layer at a plurality of locations, wherein the phosphor layer and the protective layer are separated by an air cushion at locations at which both layers are not in direct physical contact with each other.

15. A radiation image read-out apparatus comprising a stimulable phosphor sheet having a stimulable phosphor layer in contact with a protective layer which is rigid and transparent, a stimulating light projecting means which projects stimulating light onto the stimulable phosphor sheet from the protective layer side, a detecting means which detects stimulated emission emitted from the stimulable phosphor layer upon exposure to the stimulating light by imaging the stimulated emission on a line sensor by an imaging lens from the protective layer side, and a conveyor means which moves the stimulable phosphor sheet relatively to the detecting means in a direction intersecting the direction in which the line sensor extends, wherein the stimulable phosphor layer and the protective layer are in direct physical contact with the stimulable phosphor layer at a plurality of locations, and wherein the phosphor layer and the protective layer are separated by an air cushion at locations at which both layers are not in direct physical contact with each other.

16. A stimulable phosphor sheet comprising a stimulable phosphor layer and a protective layer, stimulating light being projected onto the stimulable phosphor layer from the protective layer side and stimulated emission emitted from the stimulable phosphor layer upon exposure to the stimulating light being detected by a line sensor through an imaging lens from the protective layer side, wherein the improvement comprises that the protective layer is formed of a rigid transparent material and the stimulable phosphor layer is in contact with the protective layer, wherein the stimulable phosphor layer and the protective layer are in direct physical contact with the stimulable phosphor layer at a plurality of locations, and wherein the phosphor layer and the protective layer are separated by an air cushion at locations at which both layers are not in direct physical contact with each other.

\* \* \* \* \*